US007472075B2

(12) United States Patent
Odinak et al.

(10) Patent No.: US 7,472,075 B2
(45) Date of Patent: Dec. 30, 2008

(54) SYSTEM AND METHOD TO ASSOCIATE BROADCAST RADIO CONTENT WITH A TRANSACTION VIA AN INTERNET SERVER

(75) Inventors: Gilad Odinak, Bellevue, WA (US); Kam-Cheong Anthony Tsoi, Overland, KS (US)

(73) Assignee: Intellisist, Inc., Bellevue, WA (US)

( * ) Notice: Subject to any disclaimer, the term of this patent is extended or adjusted under 35 U.S.C. 154(b) by 0 days.

(21) Appl. No.: 09/884,854

(22) Filed: Jun. 18, 2001

(65) Prior Publication Data

US 2002/0143645 A1 Oct. 3, 2002

Related U.S. Application Data

(60) Provisional application No. 60/280,375, filed on Mar. 29, 2001.

(51) Int. Cl.
*G06Q 30/00* (2006.01)
(52) U.S. Cl. .................... 705/26; 705/14; 709/219; 455/77; 455/150.1; 725/62; 701/1
(58) Field of Classification Search ............... 705/26, 705/14, 27; 455/414, 77, 414.2, 150.1; 370/313; 701/1; 709/219; 725/74–76, 58, 62; 714/746
See application file for complete search history.

(56) References Cited

U.S. PATENT DOCUMENTS

| 5,732,074 A | * | 3/1998 | Spaur et al. ................. 370/313 |
| 5,867,780 A | * | 2/1999 | Malackowski et al. ....... 455/414 |
| 6,105,060 A | * | 8/2000 | Rothblatt .................... 709/219 |
| 6,206,283 B1 | | 3/2001 | Bansal et al. |
| 6,349,329 B1 | * | 2/2002 | Mackintosh et al. ......... 709/219 |
| 6,484,147 B1 | * | 11/2002 | Brizendine et al. ............ 705/14 |
| 6,516,466 B1 | * | 2/2003 | Jackson ....................... 725/62 |
| 6,526,335 B1 | * | 2/2003 | Treyz et al. .................... 701/1 |
| 6,615,381 B1 | * | 9/2003 | Fukuda et al. ............... 714/746 |

(Continued)

OTHER PUBLICATIONS

Jameel et al., "Internet multimedia on wheels: connecting cars to cyberspace", Daimler-Benz Research and Technology North America Research and Technology Center, Palo Alto, CA, USA, published in Intelligent Transportation System, 1997., IEEE Conference on 9-12, pp. 637-642, Nov. 1997.*

(Continued)

*Primary Examiner*—Yogesh C Garg
(74) *Attorney, Agent, or Firm*—Richard T. Black; Black Lowe & Graham, PLLC

(57) ABSTRACT

A system and method for providing services to users in vehicles based on radio broadcasts received by a vehicle's radio receiver. The system includes a computer-based vehicle unit located in a vehicle, a gateway configured to wirelessly send and receive information to and from the vehicle unit, and a computer-based server in communication with the gateway over a network. The vehicle unit includes a user interface component that presents the received content and radio broadcast and records user requests. The server processes the requests and sends confirmation messages back to the unit via the gateway when a request is completed or other information needs to be sent to the unit. The vehicle unit wirelessly receives a radio broadcast from a radio station, transmits user requests and vehicle information to the server via the gateway, and receives content back from the server.

46 Claims, 3 Drawing Sheets

U.S. PATENT DOCUMENTS

| | | | | |
|---|---|---|---|---|
| 6,628,928 | B1* | 9/2003 | Crosby et al. | 455/77 |
| 6,779,196 | B1* | 8/2004 | Igbinadolor | 725/75 |
| 6,895,238 | B2* | 5/2005 | Newell et al. | 455/414.2 |
| 2002/0046084 | A1* | 4/2002 | Steele et al. | 705/14 |
| 2005/0028208 | A1* | 2/2005 | Ellis et al. | 725/58 |

OTHER PUBLICATIONS

Stirling et al. ; "Mobile Multimedia Platforms", paper appeared in : Vehicular Technology Conference, 2000, IEEE-VTS Fall VTC 2000, 52$^{nd}$, pp. 2541-2548 vol. 6, Sep. 24-28, 2000, Boston, MA, USA extracted on Internet from IEEE database on May 27, 2002.*

Nusser et al., Bluetooth-based Wireless Connectivity in an Automotive Environment ., Vehicular Technology Conference, 2000. IEEE-VTS Fall VTC 200. 52nd, On pp. 2541-2548 vol. 6, Sep. 24-28, 2000 Boston, MA, USA, entire document.

Yilin Zhao, Efficient and reliable data transmission for cellular-and-GPS-based mayday systems, Intelligent Transportation System, 1997. ITSC'97., IEEE Conference, On pp. 555-559, Nov. 9-12, 1997, Boston, MA, USA, entire document.

Stirling, A, Mobile multimedia platforms, Vehicular Technology Conference, 2000. IEEE-VTS Fall VTC 200. 52nd, On pp. 2541-2548 vol. 6, Sep. 24-28, 2000 Boston, MA, USA, entire document.

Jameel et al., Interest Multimedia on Wheels: Connecting Cars to Cyberspace, Intelligent Transportation System, 1997.ITSC'97, IEEE Conference, On pp. 637-642, Nov. 9-12, 1997, Boston, MA, USA, entire document.

* cited by examiner

SYSTEM AND METHOD TO ASSOCIATE BROADCAST RADIO CONTENT WITH A TRANSACTION VIA AN INTERNET SERVER

PRIORITY CLAIM

This application claims priority from Provisional Application filed Mar. 29, 2001, Ser. No. 60/280,375.

FIELD OF THE INVENTION

This invention relates generally to data communication and, more specifically, to data communication to vehicles.

BACKGROUND

With the increased popularity of wireless telecommunication via cellular phones, personal data assistants, and computers, literally millions of consumers are gaining access to the Internet for information, services, and applications. Mobile telecommunication is especially useful for vehicular travelers, providing them with universal access to information and applications. Attempts have been made to parley traditional mobile telecommunications systems into vehicle-based systems that allow users to more easily and safely gain information and complete transactions from the convenience of their automobile. One such attempt, for instance, allows users to purchase music heard over the radio by contacting an automated purchasing service via a cellular telephone after hearing the music over the vehicle radio. Such attempts, however, are generally limited to a single transaction or information request for only a specific type of product, and do not provide the user with a wide range of information and transaction options related to a variety of products and services. Moreover, such attempts do not incorporate the use of vehicle information, such as vehicle location, traveling speed, and direction, to customize and tailor the information and transaction options to the specific needs of the user.

There is a need for a system and method that provides greater flexibility for a user to obtain information and complete transactions related to a wide range of products and services advertised over the radio, for example, food, music, event tickets, and books. The system and method should also allow a mobile user to obtain customized information and complete transactions associated with broadcast radio content based on specific information related to the vehicle's particular circumstances.

SUMMARY

The present invention provides a system and method for providing services to users in vehicles based on radio broadcasts received by a radio receiver in the vehicle. The system includes a computer-based vehicle unit located in a vehicle, a gateway configured to wirelessly send and receive information to and from the vehicle unit, and a computer-based server in communication with the gateway over a network. The vehicle unit wirelessly receives a radio broadcast from a radio station, transmits vehicle information, communicates radio broadcast information to the server via the gateway, and receives content from the server via the gateway. The vehicle information includes vehicle location and the broadcast frequency or station identification to which the radio receiver is tuned. The content is associated with the radio broadcast. The vehicle unit includes a user interface component that presents the received content and radio broadcast and records user requests. The server processes the requests and sends confirmation messages back to the unit via the gateway when a request has been completed or other information needs to be sent to the unit.

The server includes a receiving component that receives information from the vehicle via the gateway, a content generator that generates content based on prestored radio broadcast information and associated vehicle information, and a first sending component that sends the generated content to the vehicle unit via the gateway. The server also includes a transaction component that completes a transaction based on the request and prestored user information, a confirmation component that generates a confirmation message based on the completed transaction, and a second sending component that sends the generated confirmation message to the vehicle via the network and the gateway.

In accordance with still further aspects of the invention, the user interface includes a microphone for recording requests and a speaker for presenting received content audibly.

In accordance with yet other aspects of the invention, the user interface includes a display for displaying one or more images or textual information associated with at least a portion of the content or the message.

In accordance with still another aspect of the invention, the transaction component includes a voice recognition processor configured to perform voice recognition processing of the recorded request.

In accordance with still further aspects of the invention, the transaction component includes a monetary transfer component configured to perform a monetary transfer with a bank system over a network connection based on user information and the user request.

In accordance with yet another aspect of the invention, the transaction component includes a business information component configured to retrieve information from a business system over a network connection based on the user request, wherein the confirmation information includes at least a portion of the information retrieved from the business system.

In accordance with further aspects of the invention, the recorded user request is a request to purchase an item offered for purchase in one or more of the received radio broadcast or the sent content.

As will be readily appreciated from the foregoing summary, the invention provides a system and method for improving services to users in vehicles based on radio broadcasts received by a radio receiver in the vehicle.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
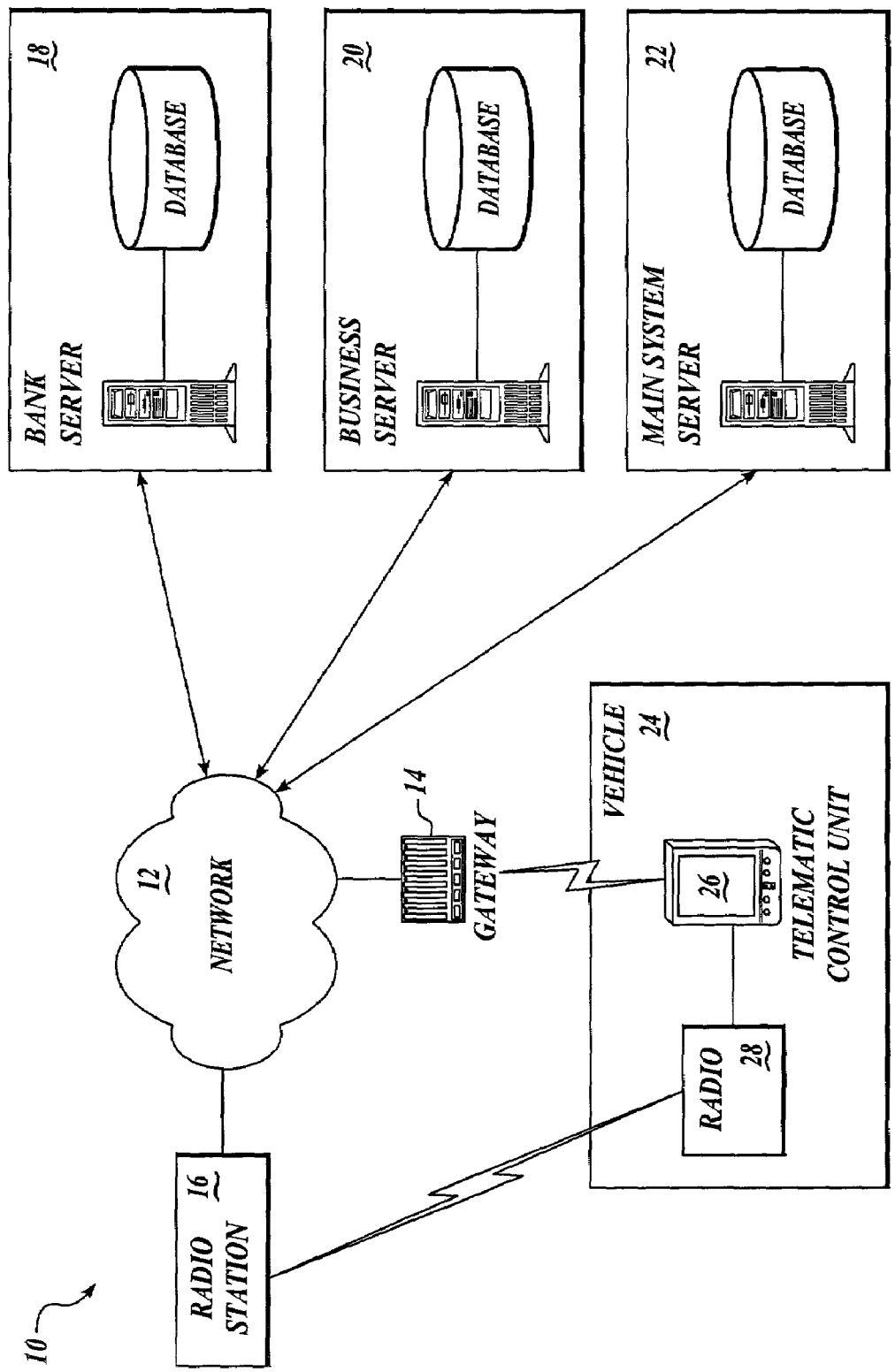
FIG. 1 is a diagram illustrating an exemplary system for performing functions of the present invention.

The present invention provides a system and method for using broadcast radio content and wireless network communication to enhance user interaction with a business from the user's vehicle. By way of overview and with reference to FIG. 1, the present invention is a system 10 that includes a network 12 (such as the Internet), a wireless gateway 14, a radio station 16, at least one financial services system 18, business system 20, and main system 22, all of which include a server and a database. Financial services system 18, business system 20, and main system 22 are coupled to network 12. A user's vehicle 24 includes a telematic control unit 26 and a radio 28.

Figure 2:
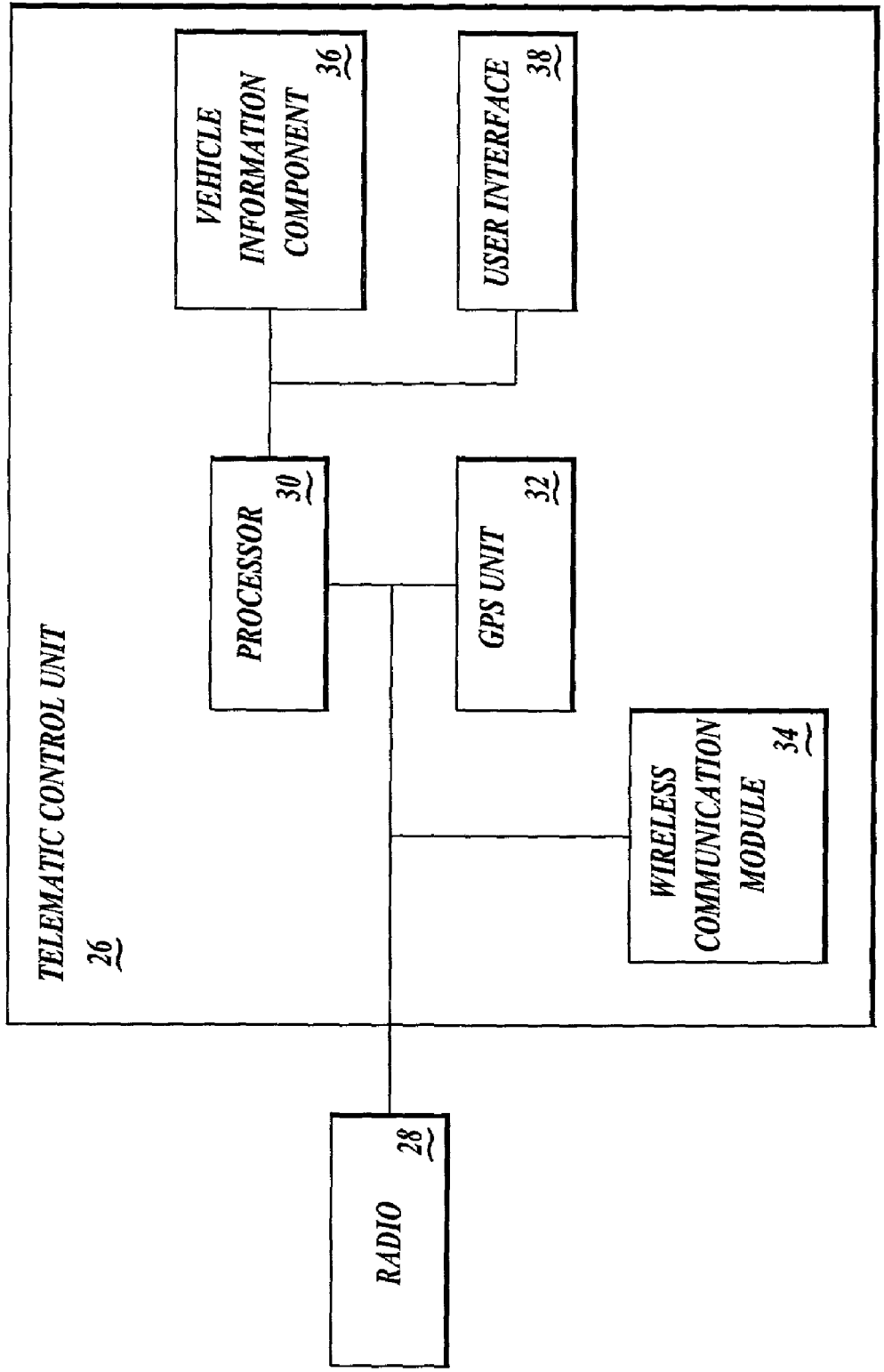
FIG. 2 is a diagram illustrating the contents of a vehicle interface unit of the present invention.

As shown in FIG. 2, the telematic control unit 26 includes a processor 30, a built-in global positioning system (GPS) unit 32, a wireless communication module 34, a vehicle information component 36, and a user interface 38. Vehicle information component 36 extracts information related to the vehicle's sensory status, such as engine specification, door lock/unlock status, and airbag deployment requirements from vehicle 24. User interface 38 includes one or more of a microphone, a speaker, a display, such as a touch sensitive screen, and user interface buttons.

Main system 22 generates interactive content for use by the user at the vehicle. The interactive content can include a wide variety of information including, for example, product information. The main system previously receives the interactive content from associated business server 20. Telematic control unit 26 sends the interactive content via gateway 14. Wireless communication module 34 wirelessly receives the interactive content from gateway 14. Processor 30 presents the received interactive content to the motorist via user interface 38. The content is presented visually, audibly, or using a combination of both. Using telematic control unit 26, the user can select from the offered content (products or services) directly related to the broadcasted radio content.

The interactive content is related to broadcasted radio content and the specific circumstances of the user. Main system 22 obtains information related to the broadcasted radio content, such as broadcast time schedule, from the business system. The main system determines what interactive content to send based on the radio station the motorist is listening to, and where to send the interactive content based on the vehicle's location. This information is obtained from the vehicle's telematic control unit. Likewise, main system 22 obtains financial account information from the user, which in turn is used to authorize purchases. The resulting system provides the user with a variety of options with respect to making purchases based on the interactive content presented over the radio. For example, if a user hears a song on the radio and requests to purchase that CD, the user can request to purchase one and have the cost charged to his/her account number and delivered to an address on file. Alternatively, the user could authorize purchase of the CD but, desiring to pick it up as soon as possible, could have the transaction completed at the nearest music store, so that the purchased product is waiting for pickup. In still another embodiment, the user drives vehicle 24 to a fast download site. The download site (i.e., hot spot) is a location that has enhanced data channel communication to vehicle 24, thereby allowing for a greater amount of data to be downloaded in a shorter period of time. The hot spot includes a wireless communications component capable of communicating wireless data transmission content at a much greater capacity to a vehicle in close proximity.

The telematic control unit's wireless communication module 34 is capable of sending and receiving both voice and data wirelessly to gateway 14. The wireless gateway is in direct communication with network 12. When a motorist or passenger makes a selection related to the presented interactive content, wireless communication module 34 sends a request in the form of a message to process a transaction to wireless gateway 14, such as a request to purchase an item. The wireless gateway directs the request to main system 22 for processing. The wireless gateway facilitates communication between a wireless network (e.g., cellular telephone network) and other networks. Bridges, routers, and switches are components of others systems that may be used to connect different networks. Main system 22 determines if the user message is associated with a bank transaction, a business transaction, or both. The main system communicates with bank server 18 for completing a bank transaction, such as verifying a user's credit card, account information and address. Once the transaction is completed, main system 22 sends confirmation back to vehicle 24 via wireless gateway 14.

In one example, if the user selects to purchase an item (e.g., a sub sandwich) that is included in a commercial advertisement radio broadcast, the GPS receiver sends the user's current vehicle location and trajectory information to main system 22 via network 12. The vehicle location is checked against the business transaction server to locate the nearest establishment associated with the broadcasted content. Furthermore, a timestamp is used in determining the estimated time of arrival (ETA) with respect to that establishment. A confirmation of the transaction and the location of the establishment are sent back to the user interface.

Figure 3:
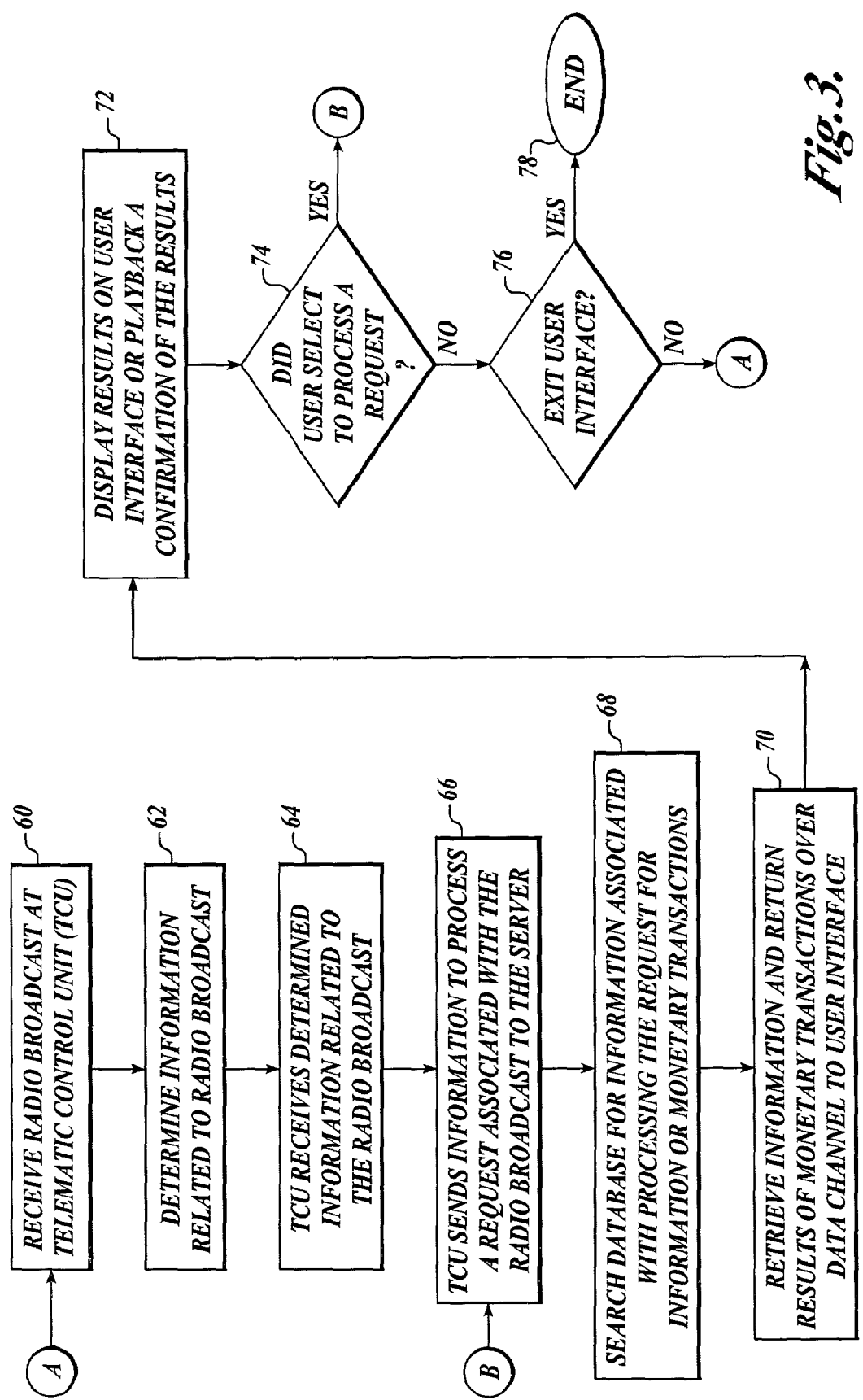
FIG. 3 is a flow chart illustrating operation of the present invention.

Referring now to FIG. 3, an illustrative routine for the operation of telematic control unit 26 utilizing main system 22 to send and retrieve information relating to monetary transactions and radio broadcast content via the Internet is described. First, at block 60, the telematic control unit 26 receives the radio broadcast signal. Typically, the radio broadcast signal originates from a radio tower in analog form and is transmitted to a radio receiver in vehicle 24. At block 62, information related to the radio broadcast is determined. In this step, the main system determines the radio broadcast channel information associated with the vehicle. This may be accomplished by sending radio broadcast channel information from the telematic control unit to the main system. The main system uses radio broadcast channel information to determine what information is related to the radio broadcast of interest to the vehicle user. At block 64, the main system 22 sends information content related to the radio broadcast to telematic control unit 26 via gateway 14. The information content is a function of what the radio station is broadcasting and the businesses that are participating in the system. Next, at block 66, if the user makes a selection pertaining to any of the information content presented by telematic control unit 26, the telematic control unit sends information related to the user's selection as well as vehicle information to main system 22 via a wireless communication link. The information sent from the telematic control unit to the main system can include vehicle location and trajectory, a request to perform a transaction, or a request for more information concerning broadcast content. The wireless communication link may include a cellular station, a satellite dish, or other wireless communication system, which provides access to network 12.

At block 68, main system 22 searches a database to process the request for more information related to the broadcasted content, or to process the request to perform a monetary transaction. In an alternative embodiment, main system 22 can send information about content to be broadcast in the near future, for example, the title of songs that will be broadcast in the next 15 minutes. This information is sent to the telematic control unit's cache memory to be displayed in a timely fashion. The telematic control unit discards the cache information in the event the user switches radio stations or frequencies.

At block 70, main system 22 retrieves textual or audio information related to the processed request and returns the results to telematic control unit 26. At block 72, the telematic control unit presents the received results, which includes a digest of information about the broadcast requested, confirmation results of any monetary transaction, and directions to a requested site or any other information generated by main system 22. The digest of information can be displayed on the telematic control unit's display, or the vehicle radio's display. The telematic control unit can also present results aurally.

In one example, a user in a vehicle listening to music wishes to request more information about the music, or wishes to purchase a CD of the playing music. For instance, the song "Candy" is playing on the radio. The display on telematic control unit 26 shows "Candy Everybody . . ." after related information is received from main system 22 via the network and the gateway. The user can request more information, by either pressing a button or uttering a keyword or phrase. For example, the user says "song information." The microphone receives these words, after which telematic control unit 26 digitizes the received words and delivers them to main system 22 for voice processing. Alternatively, the content may have already been downloaded and is simply played to the user. The telematic control unit either responds aurally and/or displays the textual information: "Candy Everybody Wants by 10,000 Maniacs, CD $7.00, in stock" that is received from main system 22. The user can further request to purchase the CD by either pressing a button or uttering a keyword. Once the user says "Purchase," the telematic control unit sends a request to the server via the network. The server processes the request to purchase the CD by contacting the CD production company using the user's financial service company to complete the transaction. The telematic control unit verbally responds or displays a confirmation, for example: "Your confirmation code is CM1234. The CD will be sent to your address on file." In another example, a user listens to an advertisement for a sandwich restaurant, the user can purchase a sub from the sandwich restaurant by either pressing a button or uttering a keyword, for example: "Buy jumbo club." The request is sent to the server via the Internet, and telematic control unit 26 responds or displays: "The nearest subway location is about 0.7 miles off exit 167 and has a drive-through. Would you like to buy your club sandwich at that location for $1.99?" The user can then purchase the sandwich, by either pressing a button or uttering "Purchase." Once the user selects to purchase the sandwich, a request is sent to the server via network 12, which processes the request and returns an order number. The telematic control unit displays or responds: "Your order number is 57."

Continuing with FIG. 3, at block 72, telematic control unit 26 displays results of a request or a confirmation of a monetary transaction. At block 74, main system 22 determines if the user selected a request for more information or a monetary transaction. As previously described, a user can request for more information or a monetary transaction related to the broadcast by either pressing a button or uttering a keyword or phrase. If it is determined that a user selected a request for a transaction (whether monetary or for more information) at block 74, the request is sent over a wireless communication link to main system 22 for processing. If, at block 74, it is determined the user did not select to process any requests, then the logic continues to decision block 76 to determine if the user has turned off the telematic control unit. If it is determined that the user wishes to continue receiving radio broadcast signals, then the logic returns to the beginning, where another radio broadcast signal is received and processed accordingly. If, at block 76, it is determined the user has turned off the telematic control unit, the process ends at block 78.

In an alternate embodiment, the vehicle is equipped with a TV receiver and the broadcast content is television. In this embodiment, the vehicle user or passenger can interact with the system in a similar manner as outlined above.

In still another embodiment, the processor in the vehicle performs voice recognition processing of the voice request to generate textual representation of the recorded request. The processor in the vehicle then sends the textual representation of the recorded request to the server.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
   receiving a radio broadcast at a vehicle, the vehicle having vehicle information;
   wirelessly transmitting content associated with the vehicle information from a server to the vehicle via a data network based on radio broadcast information associated with the received radio broadcast;
   automatically presenting the content over a user interface at the vehicle;
   after receiving the radio broadcast and transmitting the content, recording at least one request made by a user based on the presented content, wherein the recording of the request is not required to receive the broadcast;
   wirelessly transmitting the recorded request to the server over the data network;
   processing at least one sent request, wherein processing comprises generating a confirmation message based on the request;
   wirelessly transmitting the generated confirmation message to the vehicle over the data network; and
   presenting the sent confirmation message over the user interface.

2. The method of claim 1, further comprising wirelessly transmitting vehicle information from the vehicle to the server over the data network.

3. The method of claim 2, wherein the content transmitted from the server to the vehicle via a data network is based on radio broadcast information associated with the vehicle information includes at least one of the vehicle's location, trajectory, information requests, or transaction requests.

4. The method of claim 1, wherein presenting comprises presenting at least a portion of the content or the message audibly.

5. The method of claim 1, wherein presenting comprises displaying visually at least a portion of the content or the message.

6. The method of claim 1, wherein recording comprises recording a phonation.

7. The method of claim 6, wherein processing comprises performing voice recognition processing of the phonation.

8. The method of claim 1, wherein processing comprises:
   contacting a bank system; and
   executing a monetary transfer based on user information and the request.

9. The method of claim 1, wherein processing comprises:
   contacting a business system; and
   sending information from the business system to the server relating to the request,
   wherein the confirmation information comprises at least a portion of the information sent by the business system.

10. The method of claim 1, wherein the recorded request comprises a request to purchase an item and the server is operable to complete the transaction.

11. A method comprising:
receiving a radio broadcast at a vehicle, the vehicle having vehicle information;
wirelessly transmitting vehicle information from the vehicle to a network gateway;
sending the vehicle information from the gateway to a server over a data network;
sending content from the server to the vehicle via the data network and the gateway based on prestored radio broadcast information associated with the received radio broadcast and associated vehicle information;
automatically presenting the content over a user interface at the vehicle;
after receiving the radio broadcast and sending the content, recording at least one request made by a user interface at the vehicle;
completing the user-authorized transaction according to the user-selectable options;
sending the recorded request to the server via the gateway and the network;
processing at least one sent request, processing comprises:
completing a transaction based on the request and prestored user information; and
generating a confirmation message based on the completed transaction;
sending the generated confirmation message to the vehicle via the data network and the gateway; and
presenting the sent confirmation message over the user interface.

12. The method of claim 11, wherein presenting comprises presenting at least a portion of the content or the message audibly.

13. The method of claim 11, wherein presenting comprises displaying visually at least a portion of the content or the message.

14. The method of claim 11, wherein recording comprises recording a phonation.

15. The method of claim 11, wherein processing comprises performing voice recognition processing of the phonation.

16. The method of claim 11, wherein processing comprises:
contacting a bank system; and
executing a monetary transfer based on user information and the request.

17. The method of claim 11, wherein processing comprises:
contacting a business system; and
sending information from the business system to the server relating to the request, wherein the confirmation information comprises at least a portion of the information sent by the business system.

18. The method of claim 11, wherein a recorded request is a request to purchase an item and the server completes the transaction.

19. A system comprising:
a computer-based vehicle unit located in a vehicle, the vehicle having vehicle information, the unit comprising:
a transmitting component;
a receiving component configured to wirelessly receive a radio broadcast over a broadcast frequency and content;
a user interface component configured to automatically present content and radio broadcast to a user and, after the content and radio broadcast are received, record a user request;
a processing component coupled to the transmitter, the user interface, the receiver, the processor comprising:
a first component configured to instruct the transmitter to send the recorded user request and the broadcast frequency associated with the received radio broadcast; and
a second component configured to process information received by the receiver for presentation by the user interface;
a gateway configured to wirelessly send and receive information to and from the vehicle unit; and
a computer-based server being in communication with the gateway over a data network, the server comprising:
a receiving component configured to receive recorded user requests from the vehicle via the gateway;
a content generator configured to generate content based on radio broadcast information;
a first sending component configured to send the generated content associated with the vehicle information to the vehicle unit via the gateway;
a confirmation component configured to generate a confirmation message based on the recorded user request; and
a second sending component configured to send the generated confirmation message to the vehicle via the data network and the gateway.

20. The system of claim 19, wherein the computer-based vehicle unit comprises a positioning system component configured to identify vehicle location and direction of travel.

21. The system of claim 20, wherein the processing component is coupled to the positioning system, and the first component of the processing component is configured to instruct the transmitter to send vehicle information, wherein the vehicle information comprises vehicle location and the broadcast frequency associated with the received radio broadcast.

22. The system of claim 19, wherein the user interface comprises a microphone for recording requests and a speaker for presenting received content audibly.

23. The system of claim 19, wherein the user interface comprises a microphone for recording requests and a speaker for presenting received content audibly.

24. The system of claim 19, wherein the user interface comprises a display for displaying one or more of an image or textual information associated with at least a portion of the content or the message.

25. The system of claim 19, further comprising:
a transaction component comprising a business information component configured to retrieve information from a business system over the data network connection based on the request; and
wherein the confirmation message generated by the confirmation component comprises at least a portion of the information retrieved from the business system.

26. The system of claim 25, wherein the transaction component comprises a voice recognition processor configured to perform voice recognition processing of the recorded request.

27. The system of claim 25, wherein the transaction component comprises a monetary transfer component configured to perform a monetary transfer with a bank system over the data network connection based on user information and the request.

28. The system of claim 19, wherein a recorded request is a request to purchase an item and the server completes the transaction.

29. A system comprising:
a computer-based vehicle unit located in a vehicle, the vehicle having vehicle information, the unit comprising:
a transmitting component;

a receiving component configured to wirelessly receive a radio broadcast over a broadcast frequency and content from a data network, the content including additional information related to the radio broadcast;

a user interface component configured to automatically present content and radio broadcast to a user and, after the content and broadcast are received, record user requests responsive to at least one of the received content and the radio broadcast;

a positioning system component configured to identify vehicle location and direction of travel;

a processing component coupled to the transmitter, the user interface, the receiver, and the positioning system, the processor comprising:

a first component configured to instruct the transmitter to send vehicle information and recorded user requests, wherein the vehicle information comprises vehicle location and the broadcast frequency associated with the received radio broadcast; and a second component configured to process information received by the receiver for presentation by the user interface;

a gateway configured to wirelessly send and receive information to and from the vehicle unit; and a computer-based server being in communication with the gateway over a network, the server comprising:

a receiving component configured to receive information from the vehicle via the gateway;

a content generator configured to generate content based on prestored radio broadcast information and associated vehicle information;

a first sending component configured to send the generated content associated with the vehicle information to the vehicle unit via the gateway;

a transaction component configured to complete a transaction based on the request and prestored user information;

a confirmation component configured to generate a confirmation message based on the completed transaction; and a second sending component configured to send the generated confirmation message to the vehicle via the network and the gateway.

30. The system of claim 29, wherein the user interface comprises a microphone for recording requests and a speaker for presenting received content audibly.

31. The system of claim 29, wherein the user interface comprises a display for displaying one or more of an image or textual information associated with at least a portion of the content or the message.

32. The system of claim 29, wherein the transaction component comprises a voice recognition processor configured to perform voice recognition processing of the recorded request.

33. The system of claim 29, wherein the transaction component comprises a monetary transfer component configured to perform a monetary transfer with a bank system over a network connection based on user information and the request.

34. The system of claim 29, wherein:
the transaction component comprises a business information component configured to retrieve information from a business system over a network connection based on the request; and
wherein the confirmation message generated by the confirmation component comprises at least a portion of the information retrieved from the business system.

35. The system of claim 29, wherein a recorded request is a request to purchase an item and the server completes the transaction.

36. An apparatus comprising:
means for receiving a radio broadcast at a vehicle, the vehicle having vehicle information;
means for wirelessly transmitting content associated with the vehicle information from a server to the vehicle via a data network based on radio broadcast information associated with the received radio broadcast;
means for automatically presenting the content over a user interface at the vehicle;
means for recording, after the content is transmitted and broadcast is received, at least one request made by a user based on the presented content;
means for sending the recorded request to the server via the network;
means for processing at least one sent request, wherein processing comprises generating a confirmation message based on the request;
means for sending the generated confirmation message to the vehicle via the network and the gateway; and
means for presenting the sent confirmation message over the user interface.

37. The apparatus of claim 36, further comprising means for wirelessly transmitting vehicle information from the vehicle to the server over the data network.

38. The apparatus of claim 37, wherein the content transmitted from the server to the vehicle via a data network is based on radio broadcast information associated with the vehicle information.

39. An apparatus comprising:
means for receiving a radio broadcast at a vehicle, the vehicle having vehicle information;
means for wirelessly transmitting vehicle information from the vehicle to a network gateway;
means for sending the vehicle information from the gateway to a server over a data network;
means for automatically sending content associated with the vehicle information from the server to the vehicle via the network and the gateway based on prestored radio broadcast information associated with the received radio broadcast and associated vehicle information;
means for presenting content over a user interface at the vehicle;
means for recording, after the content is sent and broadcast is received, at least one request made by a user based on the presented content;
means for sending recorded request to the server via the gateway and the network;
means for processing at least one sent request, processing comprising:
means for completing a transaction based on the request and prestored user information; and
means for generating a confirmation message based on the completed transaction;
means for sending the generated confirmation message to the vehicle via the network and the gateway; and
means for presenting the sent confirmation message over the user interface.

40. A system comprising:
a computer-based vehicle unit located in a vehicle, the vehicle having vehicle information, the unit comprising:
a transmitting component;
a receiving component configured to automatically and wirelessly receive a television broadcast over a broadcast frequency and content;

a user interface component configured to present received content and television broadcast to a user and recording user requests after the content is received and broadcast is received;

a positioning system component configured to identify vehicle location and direction of travel;

a processing component coupled to the transmitter, the user interface, the receiver, and the positioning system, the processor comprising:

a first component configured to instruct the transmitter to send vehicle information and recorded user requests, wherein the vehicle information comprises vehicle location and the broadcast frequency associated with the received television broadcast; and a second component configured to process information received by the receiver for presentation by the user interface;

a gateway configured to wirelessly send and receive information to and from the vehicle unit; and a computer-based server being in communication with the gateway over a data network, the server comprising:

a receiving component configured to receive information from the vehicle via the gateway;

a content generator configured to generate content based on prestored television broadcast information and associated vehicle information;

a first sending component configured to send the generated content associated with the vehicle information to the vehicle unit via the gateway;

a transaction component configured to complete a transaction based on the request and prestored user information;

a confirmation component configured to generate a confirmation message based on the completed transaction; and a second sending component configured to send the generated confirmation message to the vehicle via the data network and the gateway.

41. A system comprising:

a computer-based vehicle unit located in a vehicle, the vehicle having vehicle information, the unit comprising:

a transmitting component;

a receiving component configured to automatically and wirelessly receive a radio broadcast over a broadcast frequency and content;

a user interface component configured to present received content and radio broadcast and recording user requests after the content and broadcast are received;

a positioning system component configured to identify vehicle location;

a processing component coupled to the transmitter, the user interface, the receiver, and the positioning system, the processor comprising:

a first component configured to instruct the transmitter to send vehicle information and recorded user requests, wherein the vehicle information comprises vehicle location and the broadcast frequency associated with the received radio broadcast;

a second component configured to process information received by the receiver for presentation by the user interface; and a third component configured to perform voice recognition processing of the recorded request;

a gateway configured to wirelessly send and receive information to and from the vehicle unit; and a computer-based server being in communication with the gateway over a data network separate from the broadcast frequency, the server comprising:

a receiving component configured to receive information from the vehicle via the gateway;

a content generator configured to generate content based on prestored radio broadcast information and associated vehicle information;

a first sending component configured to send the generated content associated with the vehicle information to the vehicle unit via the gateway;

a transaction component configured to complete a transaction based on the voice recognition processed request and prestored user information;

a confirmation component configured to generate a confirmation message based on the completed transaction; and a second sending component configured to send the generated confirmation message to the vehicle via the network and the gateway.

42. The system of claim 41, wherein the user interface comprises a microphone for recording requests and a speaker for presenting received content audibly.

43. The system of claim 41, wherein the user interface comprises a display for displaying one or more of an image or textual information associated with at least a portion of the content or the message.

44. The system of claim 41, wherein the transaction component comprises a monetary transfer component configured to perform a monetary transfer with a bank system over a network connection based on user information and the request.

45. The system of claim 41, wherein:

the transaction component comprises a business information component configured to retrieve information from a business system over a network connection based on the request; and wherein the confirmation message generated by the confirmation component comprises at least a portion of the information retrieved from the business system.

46. The system of claim 41, wherein a recorded request is a request to purchase an item and the server completes the transaction.

* * * * *